United States Patent
Griffith, Jr.

(10) Patent No.: US 9,163,165 B2
(45) Date of Patent: Oct. 20, 2015

(54) PRIMERLESS REMOVABLE ADHESIVE SYSTEMS

(71) Applicant: Rohm and Haas Company, Philadelphia, PA (US)

(72) Inventor: William B. Griffith, Jr., North Wales, PA (US)

(73) Assignee: Rohm and Haas Company, Philadelphia, PA (US)

(*) Notice: Subject to any disclaimer, the term of this patent is extended or adjusted under 35 U.S.C. 154(b) by 81 days.

(21) Appl. No.: 13/771,192

(22) Filed: Feb. 20, 2013

(65) Prior Publication Data

US 2014/0120338 A1 May 1, 2014

Related U.S. Application Data

(60) Provisional application No. 61/608,731, filed on Mar. 9, 2012.

(51) Int. Cl.
*C09J 7/04* (2006.01)
*C09J 133/02* (2006.01)
*C08K 5/01* (2006.01)

(52) U.S. Cl.
CPC ............. *C09J 7/045* (2013.01); *C09J 133/02* (2013.01); *C08K 5/01* (2013.01); *C08L 2201/54* (2013.01); *C09J 2203/334* (2013.01); *C09J 2205/102* (2013.01); *C09J 2433/00* (2013.01); *Y10T 428/249962* (2015.04)

(58) Field of Classification Search
CPC .... C09J 7/045; C09J 133/02; C09J 2203/334; C09J 2205/102; C09J 2433/00; Y10T 428/249962; C08L 2201/54; C08K 5/01

USPC ........................................... 428/343, 355 AC
See application file for complete search history.

(56) References Cited

U.S. PATENT DOCUMENTS

| | | | |
|---|---|---|---|
| 5,073,457 | A | 12/1991 | Blackwell |
| 5,925,432 | A | 7/1999 | Kian et al. |
| 6,368,707 | B1 | 4/2002 | Kamiya et al. |
| 2003/0108736 | A1 | 6/2003 | Contrada et al. |
| 2007/0167546 | A1 | 7/2007 | Yatagai et al. |
| 2011/0104486 | A1* | 5/2011 | Ma et al. ............. 428/355 AC |

FOREIGN PATENT DOCUMENTS

| | | |
|---|---|---|
| DE | 4432368 A1 | 3/1996 |
| WO | 97/23577 A1 | 7/1997 |

OTHER PUBLICATIONS

Fujita, et al., "Miscibility between Natural Rubber and Tackifiers. I. Phase Diagrams of the Blends of Natural Rubber with Rosin and Terpene Resins", Journal of Applied Polymer Science, vol. 64, issue 11, pp. 2191-2197 (Jun. 13, 1997).

* cited by examiner

*Primary Examiner* — Victor Chang
(74) *Attorney, Agent, or Firm* — Carl P. Hemenway

(57) ABSTRACT

This invention relates to a primerless removable or repositionable pressure sensitive tape or label comprises a porous substrate material, and a pressure sensitive adhesive (PSA) composition comprising (i) 10 to 90 wt. %, based on the combined weight of parts (i) and (ii), of one or more aqueous adhesive (co)polymer, and (ii) 90 to 10 wt. %, based on the combined weight of parts (i) and (ii), of one of more water-dispersed thermoplastic material, wherein the water-dispersed thermoplastic material is incompatible with the aqueous adhesive (co)polymer.

7 Claims, No Drawings

PRIMERLESS REMOVABLE ADHESIVE SYSTEMS

This invention relates to a primerless pressure sensitive tape or label that comprises a porous substrate material, and a pressure sensitive adhesive (PSA) composition comprising (i) 10 to 90 wt. %, based on the combined weight of parts (i) and (ii), of one or more aqueous adhesive (co)polymer, and (ii) 90 to 10 wt %, based on the combined weight of parts (i) and (ii), of one of more water-dispersed thermoplastic material, wherein the water-dispersed thermoplastic material is incompatible with the aqueous adhesive (co)polymer. The invention may be in the form of a paper label made with the PSA composition. The tapes and labels of the invention may be removable or repositionable.

BACKGROUND

Removable adhesives are increasingly being used in many specialized tape and label applications. Adhesives are said to be removable when the tape or label structure can be removed without facestock failure or without significant residue being left behind after removal. These adhesives are comprised of many different chemistries and carriers. Many different performance profiles are needed due to the large number of application conditions, facestocks used, and end use substrates on which they are applied.

Because the adhesion level of these materials is engineered to be very low, anchorage (or adhesion) to the facestock can be a problem. This is generally overcome by the use of a primer coating which adds cost and complexity to the structure. Some facestocks can be purchased pre-primed with a higher energy coating. Many times, a primer is coated and dried on the facestock, either in-line with the adhesive coating, or as a separate pass on the coating equipment. Some of the most effective primers are permanent PSAs; however, this approach adds another additional layer of complexity. If the primer is tacky, it cannot be rewound in a self-wound manner. Another means of priming is to coat a non-pressure sensitive material on a facestock that has exceptional specific adhesion to the removable adhesives. This is usually the approach taken when the primer has to be applied in a separate pass and a primed face stock rewound prior to coating the adhesive. Often these are materials that are very similar to the chemistry of the adhesive. Furthermore, when the primer is applied to a porous face stock in a fluid state, it can flow into the facestock to some degree and when set, can form very strong bonds due to entanglements. Hence, anchorage is improved. Either way, the cost and complexity of the system is affected by the use of a primer to promote adhesion to the facestock.

The effectiveness of a removable adhesive can be evaluated by examining the residues left on stainless steel panels after performing a peel test on adhesives that were coated onto primed and unprimed facestocks. Samples may be heat aged (for example, at 50 C for one week before peeling) to provide more comprehensive data. Under such conditions, comparing primed and unprimed systems, the unprimed system shows substantial adhesive residue on the stainless steel panel indicating significant transfer of the adhesive from the facestock where it was designed to remain, to the substrate to which it had been applied. Removability of the primed system is evidenced by the essential lack of adhesive residue on the panel.

To further illustrate the need for priming, two different adhesives aged on a stainless steel substrate a function of time. Even though there is a lower peel and higher peel adhesive, both transfer to the substrate regardless of dwell time. As can be seen in Table 1, priming is an effective means of improving anchorage.

TABLE 1

| | 90° Stainless Steel Peels (oz./in.) of Primed and Unprimed Adhesives | | | |
| --- | --- | --- | --- | --- |
| | 20 Min | 24 Hr | 1 Week | 1 Week 50° C. |
| ROBOND PS-8120HV unprimed | 3.6 AFB | 4.4 AFB | 5.8 AFB | 6.4 AFB |
| ROBOND PS-8120HV primed with RHOPLEX P-376 | 6.0 A | 7.4 A | 6.3 A | 8.2 A |
| ROBOND PS-8931 unprimed | 6.8 AFB | 8.9 AFB | 11.0 AFB | 6.8 AFB |
| ROBOND PS-8931 primed with P-376 | 13.3 A | 16.4 A | 15.3 A | 12.9 A |

A = Adhesive Failure, AFB = Adhesive from Backing failure.

In cases where the facestock of interest is porous, such as paper facestocks, improved anchorage could be achieved with just a single pass adhesive, if the adhesive would flow into the pores. Removable adhesives typically have very high cohesive strength and relatively little cold flow, so when they are transfer coated, only a very minor portion will flow into the pores. One approach to alleviate this problem is to add material that will flow into the pores while coating, yet have very little cold flow in its end use. Materials that are either thermoplastic or display some crystallinity have the potential of being of lower viscosity in a molten phase, yet rigid when in a glassy or crystalline state. Since the coating of most PSAs requires heat, it is possible to identify a material that undergoes a phase transition between the temperature a web would reach during the coating process and ambient conditions. Moreover, it is highly desirable that this material remain as a separate phase from the bulk of the adhesive if this desired phenomenon is to be maintained.

To examine this phenomenon in more detail, samples with and without a thermoplastic filler (35 wt. %) were prepared and transfer coated onto paper by sending the laminate through a hot nip. Afterwards, cross-sections were prepared by a cryosectioning and the surfaces were imaged by scanning electron microscopy. Since the filler is a relatively molten, low-viscosity material when nipped, it is more apt to flow into the pores of the paper. In a micrograph, this difference appears to be visible as the rougher interface, as compared to systems without the thermoplastic filler. Additional testing showed that anchorage was clearly improved with the addition of the filler.

Historically, PSA formulations have been identified that achieve this effect by adding wax to the adhesive; for example, Blackwell, U.S. Pat. No. 5,073,457 (assigned to 3M). Blackwell taught blending of a petroleum wax (paraffin wax or a polyethylene or polypropylene was emulsion) with a solvent-based or water-based acrylic adhesive. In Blackwell, relatively low levels of wax were used and the patent describes improved anchorage which was speculated to be associated with flow of the wax into pores in the substrate. Waxes are of low surface energy and low viscosity when in the molten form. Consequently, they can be added at low levels to reduce adhesion, since thermodynamically, they should be driven to the surface. This could also limit how much material is available to flow into pores of the substrate because higher levels of wax might overwhelm the surface of the adhesives to such an extent that too much adhesion would be lost.

The present invention provides a cost-effective and easy to manufacture primerless, removable PSA system which further provides improved balance of cohesive integrity within the system and adhesive performance of the resulting system. The use of C5-based tackifiers or other suitable thermoplastic fillers further provides a more controllable system to balance those properties.

SUMMARY OF THE INVENTION

The primerless pressure sensitive tape or label of the present invention comprises a porous substrate material, and a pressure sensitive adhesive (PSA) composition comprising (i) 10 to 90 wt. %, based on the combined weight of parts (i) and (ii), of one or more aqueous adhesive (co)polymer, and (ii) 90 to 10 wt %, based on the combined weight of parts (i) and (ii), of one of more water-dispersed thermoplastic material, wherein the water-dispersed thermoplastic material is incompatible with the aqueous adhesive (co)polymer. The invention may be in the form of a paper label made with the PSA composition. The tapes and labels of the invention may be removable or repositionable.

The porous substrate of the primerless pressure sensitive tape or label may comprise paper. The aqueous adhesive copolymer of the primerless pressure sensitive tape or label may comprise an acrylate (co)polymer and the water-dispersed thermoplastic material may be selected from the group consisting of C5-based tackifiers, styrene block copolymers, ethylene vinyl acetate copolymers, ethylene acrylic copolymers and olefinic (co)polymers. Preferably, the water-dispersed thermoplastic material comprises one or more C5-based tackifier.

The aqueous adhesive (co)polymer may have a Tg of 0° C. or below, and may be formed from one or more ethylenically unsaturated monomers. The monomers used to form the aqueous adhesive may be selected from the group consisting of ($C_1$-$C_{20}$) alkyl or ($C_3$-$C_{20}$) alkenyl esters of (meth)acrylic acid, and combinations thereof. The primerless pressure sensitive tape or label may further comprise one more components selected from the group consisting of surfactants, rheology modifiers, crosslinkers, defoamers, plasticizers, non C5-based tackifiers, pigments, and stabilizers.

DETAILED DESCRIPTION OF THE INVENTION

The primerless pressure sensitive tape or label of the present invention comprises a porous substrate material, and a pressure sensitive adhesive (PSA) composition comprising (i) 10 to 90 wt. %, based on the combined weight of parts (i) and (ii), of one or more aqueous adhesive (co)polymer, and (ii) 90 to 10 wt %, based on the combined weight of parts (i) and (ii), of one of more water-dispersed thermoplastic material, wherein the water-dispersed thermoplastic material is incompatible with the aqueous adhesive (co)polymer. The invention may be in the form of a paper label made with the PSA composition. The tapes and labels of the invention may be removable or repositionable.

The PSA useful in the primerless tape or label may comprise an aqueous acrylate adhesive (co)polymer blended with a water-dispersed thermoplastic material. By "acrylate" is meant that the adhesive polymer is formed with 50% or more of monomers based on (meth)acrylic acid and esters of (meth) acrylic acid. The aqueous PSA (co)polymer may have a Tg of 0° C. or below, or –20° C. or below, or in the range from –20 to –60° C., or in the range from –20 to –65° C.

The aqueous PSA (co)polymer may be polymerized using one or more of a variety of ethylenically unsaturated monomers. Examples of monoethylenically unsaturated monomers suitable for use in forming the aqueous PSA include various ($C_1$-$C_{20}$) alkyl or ($C_3$-$C_{20}$) alkenyl esters of (meth)acrylic acid, including methyl acrylate (MA), methyl methacrylate (MMA), ethyl(meth)acrylate (EA and EMA), butyl(meth)acrylate (BA and BMA), 2-hydroxyethyl(meth)acrylate (HEA and HEMA), 2-ethylhexyl(meth)acrylate (EHA and EHMA), benzyl(meth)acrylate, lauryl(meth)acrylate, oleyl(meth)acrylate, palmityl(meth)acrylate, and stearyl(meth)acrylate; as well as styrene, vinyltoluene, ethylene, vinyl acetate, vinyl chloride, vinylidene chloride, acrylonitrile, (meth)acrylamide. The use of the term "(meth)" followed by another term, such as in (meth)acrylate or (meth)acrylamide, as used throughout the disclosure, refers to both acrylates or acrylamides and methacrylates and methacrylamides, respectively.

The aqueous PSA (co)polymer may also be formed from other monomer types. For example, the PSA may be a styrene-butadiene-rubber (SBR) composition, a natural rubber (NR) composition, olefin block copolymer (OBC) compositions, or combinations of those materials with acrylate (co)polymers described above.

The water-dispersible thermoplastic material to be blended with the water-based PSA is selected from the group consisting of C5-based tackifiers, styrene block copolymers, ethylene vinyl acetate copolymers, ethylene acrylic copolymers and olefinic (co)polymers, or combinations thereof. C5-based tackifiers refers to materials derived from the C5 cut of the petroleum refining process, for example piperylene. These are generally comprised of isomers of pentene and pentadiene. They may be linear, branched or cyclic, or combinations thereof. The weight average molecular weight of the C5-based tackifiers is generally less than 10,000. Suitable commercially available C5-based tackifiers include, but are not limited to, TACOLYN 5193 available from Eastman Chemical Company (Kingsport, Tenn.). In cases in which the C5-based tackifier resin would be compatible with the PSA polymer, other non-compatible resins can readily be identified by those skilled in the art for use as the water-dispersible thermoplastic material. See, for example, M. Fujita et al., "Miscibility between Natural Rubber and Tackifiers. I. Phase Diagrams of the Blends of Natural Rubber with Rosin and Terpene Resins", *Journal of Applied Polymer Science*, vol. 64, issue 11, pp. 2191-2197 (13 Jun. 1997), which describes polymerized rosin tackifiers which are not compatible with natural rubber.

The water-dispersible thermoplastic material may be a hydrocarbon (co)polymer including, but not limited to, olefinic (co)polymers made according to the BlueWave™ mechanical dispersion process of The Dow Chemical Company. One example of such a material is HYPOD™ 8501 dispersion from The Dow Chemical Company (Midland, Mich.).

The water-dispersible thermoplastic material may be present at a level of from 10 to 90 wt. %, based on the total weight of the adhesive polymer and the thermoplastic material, or 10 to 40 wt. %, or 25 to 35 wt. %. Complementarily, the adhesive polymer may be present at a level of from 90 to 10 wt. %, based on the total weight of the adhesive polymer and the thermoplastic material, or 60 to 90 wt. %, or 65 to 75 wt. %.

Suitable materials for the thermoplastic material include, but are not limited to, any thermoplastic material that would not be compatible with the adhesive itself; that is, the added material forms two distinct phases when blended with the adhesive (co)polymer, each with its own glass transition temperature (Tg) or melting temperature (Tm). The non-compatible or incompatible materials do not mix at the molecular level with the material to which they are added. If the adhesive is an acrylic (co)polymer, suitable thermoplastic filler materials would include incompatible tackifiers (such as C5-based tackifiers), styrene block copolymers, ethylene vinyl acetate copolymers, ethylene acrylic copolymers and olefinic polymers. Water-dispersible material suitable for use in a water-based PSA should have a modulus of greater than $10^7$ dynes/cm at 25° C. and less than $10^4$ dynes/cm at 150° C.

For non-acrylate adhesives, the skilled practitioner can select suitable thermoplastic material. High molecular weight polymers are generally incompatible with one another. Certain characteristics of the materials can direct proper selection and avoid undesirable combinations. For example, if other additives such as tackifiers, plasticizers or oils, are compatible in both the thermoplastic material and the polymer, it will make the formulation difficult to handle. In addition, if both the adhesive and the thermoplastic material have a common phase (e.g., ethylene), there may be issues around the phases interacting, which would again lead to difficult to handle formulations.

Those skilled in the art can readily identify polymers that are not compatible with one another. Although many monomers may be soluble in various polymers, when these monomers are polymerized, solubility decreases appreciably with the degree of polymerization. For example, in the case of natural rubber latex, those skilled in the art could readily identify an acrylic (co)polymer or ethylene vinyl acetate (EVA) (co)polymer that would be phase incompatible. For styrene butadiene latex, an acrylic or EVA (co)polymer could readily be identified that would form a second phase (i.e., be incompatible).

The molecular weight of the adhesive polymer will depend on the chemistry selected. In general, for non-blocky polymers, such as most acrylate (co)polymers, weight average molecular weights will be in excess of 100,000 amu. The molecular weight of the thermoplastic material will typically be less 100,000 amu and can be as low as around 1000 amu.

The primerless pressure sensitive tape or label is formed by coating the PSA composition (including the thermoplastic material and other components) on the porous substrate material. One method to prepare the tape or label construct is to draw down the PSA composition on to a silicone release liner (e.g., at a dried coat level of 0.8 mils), and to then transfer the layer of PSA composition from the release liner to the desired porous substrate. In this method, it is desirable to conduct the transfer step with the PSA composition at an elevated temperature (for example at a temperature of 60° C. or above, or 80° C. or above, or 100° C. or above, or 60 to 120° C.), at a temperature at or above the melting temperature (Tm) or glass transition temperature (Tg) of the thermoplastic material. Alternatively, a thermoplastic material can be selected such that it becomes molten when heated and has an extended set time; that is, the thermoplastic polymer can be cooled to temperatures below which it will solidify and yet remain molten for an extended period of time. Certain thermoplastic polymers may have longer "open times;" which can result in the case of crystalline polymers that can be super-cooled after they are melted in the oven. This can be advantageous, since it gives more time to transfer them to the paper facestock when the adhesive leaves the oven. For example, this phenomenon is well known for formulations based on EVA (co) polymers.

Without intending to be bound by any theory, it is believe that having the composition in molten state (with or without elevated temperature) facilitates the anchorage effect of the thermoplastic material migrating into the pores of the porous substrate. The PSA composition may be at a suitable elevated temperature when it is contacted with the porous substrate. In the process using a release liner, it is sufficient if the laminate of release liner/PSA composition/porous substrate is nipped between heated rollers at a suitable temperature and line speed. One set of conditions would be a temperature of 105° C. and line speed of 10 m/min Other means to accomplish the coating step are well known in the art.

The porous substrate used to form the primerless pressure sensitive tape or label may be paper, fabric, or a composite or web. Substrates may be coated or uncoated, provided the resulting material retains sufficient porosity. Paper can include materials such as card stock and other such materials.

The PSA used to form the primerless pressure sensitive tape or label may further comprise one more components selected from the group consisting of surfactants, rheology modifiers, crosslinkers, defoamers, plasticizers, non C5-based tackifiers, pigments, and stabilizers (e.g., UV stabilizer, antioxidant).

The Dow Chemical Company has been able to economically disperse higher molecular weight polymers through use of its BlueWave™ technology (see, Chemical and Engineering News, vol. 84 (49), p. 40 (2006)). This is a patented process for mechanically dispersing higher molecular weight polymers while achieving lower particle size. Consequently, many thermoplastic materials can now be prepared as dispersions that historically were not commercially available. Having a wider array of materials also permits one to better tune the finished material to the needs of the application.

Consider the steps that occur in a transfer coated process. First, a material is coated onto a release liner, dried in the oven, and once it exits the oven, passes through a nip where it is then transferred to the facestock. In certain cases, paper webs are remoistened in order to minimize curl. In other words, there is plenty of opportunity for the web to cool once it exits the oven. Hence, any formulation that extends the open time of the molten filler material is advantageous. The present invention achieves that goal of longer open time with more time for the thermoplastic material to penetrate the substrate and enhance anchorage. This can be achieved by selecting thermoplastic material that can be cooled below its melting point without immediately solidifying One example is HYPOD 8501 (The Dow Chemical Company (Midland, Mich.)).

The primerless pressure sensitive tape or label of the present invention may be used to form paper-based tapes and labels which may have the property of being removable or repositionable. Such tapes and labels may be formed from a facestock other than paper, provided the facestock has suitable porosity. The resulting tape or label may be used as masking tape, painters tape, label, removable note system, and other applications benefitting from removability.

Phase transitions can readily be followed by differential scanning calorimetry (DSC), a technique where heat flow is monitored while ramping up temperature at a controlled rate. As deduced from thermograms of a water-based acrylate (co)polymer formulated with a dispersed wax, the phase transition of the wax is detected around 80 C and there is only a few degrees difference between the melt and recrystallization temperature. This suggests that the wax will rapidly harden when cooled.

By carefully selecting the raw materials of the thermoplastic material, the recrystallization temperature can be depressed, thereby extending the open time as it cools. As an example, consider the case of a dispersed polyethylene polymer. Using DSC, thermograms of a water-based acrylate PSA formulated with 30 wt. % of a polyolefin dispersion were generated. Once again, the phase transition was above ambient conditions. However in this case, the degrees difference in where the melting is completed and recrystallization begins is around 30 C. At the 10 C/minute cooling rate, this corresponds to 3 minutes in real time. Since the time for the laminate to travel through the oven and nipping point is only a few seconds, this difference may even be greater in commercial applications.

EXAMPLES

Two adhesives, ROBOND™ PS-8931 and ROBOND PS-8120HV (The Dow Chemical Company (Midland, Mich.)), were formulated with various levels of two fillers, TACOLYN 5193 and HYPOD 8501, as alternatives to priming paper. To prime samples, a binder, P-376, was coated onto 60# Krome paper. Adhesive samples were transfer coated from Chemsultants RP-12 release liner to Krome paper and dried in an 80° C. oven for 5 minutes. To facilitate a failure mode change from AFB to Adhesive during adhesion testing, samples were passed through a 225° F. (108° C.) laminator at approximately 12 feet/minute (ca. 4 m/min) after draw downs.

Peel was measured at designated times (20 minutes, one day, and one week) on samples held at PSTC environmental test conditions. In order to accelerate ageing and peel build effects, samples were placed in 50° C. oven for one week. PSTC test method 101 was used for measuring 180° peel.

TABLE 2

Peel and Peel-build

|  | 20 Min | 24 Hr | 1 Week | 1 Week @ 50° C. |
|---|---|---|---|---|
| ROBOND PS-8931 coated onto RHOPLEX P-376 primed | 15.0 A | 21.2 A | 22.1 A | 17.3 A |
| ROBOND PS-8931 + 30% HYPOD 8501 with heat lamination | 2.8 A | 6.0 A | 4.1 A | 4.5 A |
| ROBOND PS-8931 with heat lamination | 9.3 A | 13.5 A | 13.5 A | 10.6 A/PT |
| ROBOND PS-8120HV with heat lamination | 8.3 A | 10.0 A | 8.3 A | 15.0 M |

A = Adhesive failure, PT = Paper tear, M = Mixed adhesive (adhesive from backing) and cohesive failure.

Adding a hard thermoplastic filler material decreased the peel of the adhesive, so a lower peel adhesive was also included as a control. Clearly, the filled sample showed good removability at all dwell times.

A final measure of anchorage was made by a finger rub test (rubbing one's finger back and forth across the surface of the adhesive and qualitatively ranking anchorage).

TABLE 3

Finger Rub Test

| Neat Adhesive | 1 |
| Neat Adhesive + 30% filler | 4 |
| Adhesive on Primed Paper | 5 |

1 = poor to 5 = excellent

Again, substantial improvement in anchorage was detected with the PSA composition comprising a blend of water-based acrylate PSA and water-dispersible incompatible thermoplastic filler material.

TABLE 4

Filler Levels

| | 90° Peel, Stainless Steel (oz./in.) | | | |
|---|---|---|---|---|
| | 20 Min | 24 Hr | 1 Week | 1 Week @ 50° C. |
| ROBOND PS-8931 + 10% w/w HYPOD 8501 | 6.0 A | 8.6 A | 10.0 A | 9.2 A |
| ROBOND PS-8931 + 20% w/w HYPOD 8501 | 5.6 A | 9.2 A | 16.4 A | 15.4 A |
| ROBOND PS-8931 + 30% w/w HYPOD 8501 | 5.3 A | 9.2 A | 11.5 A | 13.2 A |
| ROBOND PS-8931 + 40% w/w HYPOD 8501 | 1.3 A | 1.7 A | 2.5 A | 1.7 A |

A = Adhesive failure,
PT = Paper tear,
M = Mixed adhesive and cohesive failure.

Adding a non-compatible, water-dispersible thermoplastic filler material to a formulation can result in a one-part, self-priming adhesive. Such a formulation can eliminate steps in the manufacturing process thereby reducing cost and complexity. In addition, recent advances in dispersing technology have made a wider range of thermoplastic materials available for use in water-based PSAs. Hence the thermal properties of any thermoplastic material phase can be better optimized for targeted end-use conditions.

What is claimed is:

1. A primerless pressure sensitive tape or label formed by a process comprising
    coating an aqueous PSA composition onto a release liner to form a coating, then drying the coating, and then passing the release liner, the coating, and a porous substrate material through a nip to transfer the coating to the porous substrate material, wherein said aqueous PSA composition comprises:
    i) 10 to 90 wt. %, based on the combined weight of parts (i) and (ii), of one or more aqueous adhesive (co)polymer, and
    ii) 10 to 90 wt. %, based on the combined weight of parts (i) and (ii), of one of more water-dispersed thermoplastic material, wherein the water-dispersed thermoplastic material is incompatible with the aqueous adhesive (co) polymer,
    and then drying said aqueous PSA composition.

2. The primerless pressure sensitive tape or label of claim 1 wherein the porous substrate material comprises paper.

3. The primerless pressure sensitive tape or label of claim 1 wherein the aqueous adhesive (co)polymer is an acrylate (co)polymer and the water-dispersed thermoplastic material is selected from the group consisting of resins derived from the C5 cut of a petroleum refining process, styrene block copolymers, ethylene vinyl acetate copolymers, ethylene acrylic copolymers and olefinic (co)polymers.

4. The primerless pressure sensitive tape or label of claim 3 wherein the water-dispersed thermoplastic material comprises one or more resins derived from the C5 cut of a petroleum refining process.

5. The primerless pressure sensitive tape or label of claim 1 wherein the aqueous adhesive (co)polymer has a Tg of 0° C. or below, and is formed from one or more ethylenically unsaturated monomers.

6. The primerless pressure sensitive tape or label of claim 1 wherein at least 50% of the monomers polymerized to form the aqueous adhesive (co)polymer are selected from the group consisting of $(C_1\text{-}C_{20})$ alkyl or $(C_3\text{-}C_{20})$ alkenyl esters of (meth)acrylic acid, and combinations thereof.

7. The primerless pressure sensitive tape or label of claim 1 wherein the aqueous adhesive (co)polymer is an acrylate (co)polymer and the water-dispersed thermoplastic material is selected from the group consisting of styrene block copolymers, ethylene vinyl acetate copolymers, ethylene acrylic copolymers and olefinic (co)polymers.

\* \* \* \* \*